(12) United States Patent
Kou

(10) Patent No.: US 11,047,490 B2
(45) Date of Patent: Jun. 29, 2021

(54) DIAPHRAGM VALVE AND FLOW RATE CONTROL DEVICE FOR SEMICONDUCTOR MANUFACTURING APPARATUS

(71) Applicant: Kitz SCT Corporation, Tokyo (JP)

(72) Inventor: Chokuto Kou, Gunma (JP)

(73) Assignee: KITZ SCT CORPORATION, Tokyo (JP)

( * ) Notice: Subject to any disclaimer, the term of this patent is extended or adjusted under 35 U.S.C. 154(b) by 0 days.

(21) Appl. No.: 16/097,995

(22) PCT Filed: Aug. 17, 2017

(86) PCT No.: PCT/JP2017/029537
§ 371 (c)(1),
(2) Date: Oct. 31, 2018

(87) PCT Pub. No.: WO2018/037993
PCT Pub. Date: Mar. 1, 2018

(65) Prior Publication Data
US 2019/0128432 A1 May 2, 2019

(30) Foreign Application Priority Data

Aug. 25, 2016 (JP) ............................. JP2016-164489

(51) Int. Cl.
*F16K 7/00* (2006.01)
*F16K 7/14* (2006.01)
(Continued)

(52) U.S. Cl.
CPC ................ *F16K 7/14* (2013.01); *F16K 7/126* (2013.01); *F16K 31/06* (2013.01); *F16K 31/60* (2013.01)

(58) Field of Classification Search
CPC ............... F16K 7/14; F16K 7/126; F16K 7/16
(Continued)

(56) References Cited

U.S. PATENT DOCUMENTS

| 5,967,492 A | 10/1999 | Navratil et al. |
| 6,092,550 A * | 7/2000 | Gotch ...................... F16K 7/16 |
| | | 137/331 |

(Continued)

FOREIGN PATENT DOCUMENTS

| JP | 08-100930 | 4/1996 |
| JP | 4587419 | 11/2010 |

(Continued)

OTHER PUBLICATIONS

International Search Report dated Oct. 24, 2017 in International (PCT) Application No. PCT/JP2017/029537.

*Primary Examiner* — Kelsey E Cary
(74) *Attorney, Agent, or Firm* — Wenderoth. Lind & Ponack, L.L.P.

(57) ABSTRACT

A diaphragm valve and a flow rate control device for a semiconductor manufacturing apparatus are configured so as to allow an increase of a valve flow rate while avoiding an increase in size of the valve. The diaphragm valve includes a diaphragm with an outer periphery being pressed and a valve seat part in a valve chamber of a body having an inflow path and an outflow path, with the diaphragm being configured to open and close the valve chamber by an ascending/descending motion of a stem. The diaphragm has a substantially-flat cross sectional form having a substantially-planar center region and a boundary region. The boundary region is on an outer peripheral side of the center region and has a radius of curvature smaller than that of the center region, and the boundary region is positioned near an outer peripheral side of the valve seat part.

2 Claims, 4 Drawing Sheets

(51) Int. Cl.
*F16K 7/12* (2006.01)
*F16K 31/60* (2006.01)
*F16K 31/06* (2006.01)

(58) Field of Classification Search
USPC .......................................................... 251/331
See application file for complete search history.

(56) References Cited

U.S. PATENT DOCUMENTS

| | | | |
|---|---|---|---|
| 2004/0094740 A1* | 5/2004 | Itoi | ............................ F16K 1/42 |
| | | | 251/331 |
| 2005/0109973 A1 | 5/2005 | Glime et al. | |
| 2016/0131269 A1* | 5/2016 | Ishibashi | .................... F16K 7/17 |
| | | | 251/331 |
| 2017/0130848 A1 | 5/2017 | Watanabe et al. | |

FOREIGN PATENT DOCUMENTS

| | | |
|---|---|---|
| JP | 2016-011744 | 1/2016 |
| WO | 2016/002515 | 1/2016 |

* cited by examiner

DIAPHRAGM VALVE AND FLOW RATE CONTROL DEVICE FOR SEMICONDUCTOR MANUFACTURING APPARATUS

TECHNICAL FIELD

The present invention relates to diaphragm valves and flow rate control devices for semiconductor manufacturing apparatuses and, in particular, to a metal diaphragm valve of a direct touch type for performing valve opening and closing by directly bringing a metal-made diaphragm into contact with or away from a valve seat.

BACKGROUND ART

In general, a high-purity gas supply system in semiconductor manufacturing process is configured so that, due to demands for space-saving of a manufacturing apparatus and so forth, various fluid control apparatuses such as a valve or various apparatuses, devices, and so forth such as a coupling, a block, and a pressure control apparatus are coupled in series to be integrated on one line and these are spread in parallel.

Also, for high-purity gas supply, characteristics such as so-called particle free and dead-space free are strictly demanded. Therefore, as a control valve for use in its plumbing system, a diaphragm-type control valve (in particular, a direct-touch type) is often adopted, in which no sliding part is provided, a dead space is minimum, and high gas replaceability and cleanliness are easily satisfied in view of structure. In particular, when the supply fluid is a high-temperature fluid, a corrosive gas, or the like, a metal diaphragm made of any of various alloys of a nickel base or cobalt base excellent in resistance to high temperatures and corrosion is often used.

On the other hand, microfabrication and high integration of semiconductor elements have advanced more in recent years. Also, with an increase in size of a silicon wafer, liquid-crystal panel, and so forth, or a reduction in running cost and an increase in size of a production system in semiconductor manufacturing, an increase in demand for improving yields, and so forth, a further increase in supply flow rate is required for various gases for use in a semiconductor manufacturing process. For this reason, an increase in supply flow rate is also required for the diaphragm valve as described above for use, in particular, as a control valve for a supply gas. This eventually leads to an improvement in structure, in general, an increase in diameter of a flow path, that is, an increase in size of the valve.

However, the diaphragm valve is integrated on a line together with other devices as described above. Furthermore, diaphragm valves are provided normally at a plurality of locations. Therefore, an increase in size also increases an installation space and, in turn, the size of the semiconductor manufacturing apparatus is also increased, posing problems such as an increase in semiconductor manufacturing cost. In particular, an increase in size to a lateral width direction brings an increase in foot space of the valve, which is crucial in optimization (integration and space-saving) of a semiconductor manufacturing apparatus.

By contrast, when the valve chamber or valve size is maintained or reduced (downsizing of a plumbing component or the like) while a flow-path space such as a flow-path diameter is increased to increase a flow rate, this brings problems such that an increase in stroke decreases the life of the diaphragm or durability and airtightness of the valve are decreased. Thus, an increase in flow rate and a decrease in size are contradictory issues. For a diaphragm valve for use in a plumbing system for a semiconductor manufacturing process, not only favorable valve sealability but also appropriately solving these problems simultaneously are issues to be accomplished. These issues are directly linked to structures such as the inside of the valve chamber and the shape of the diaphragm, and PTL 1 has been suggested as related prior art.

The diaphragm valve described in PTL 1 includes an elastically-deformable spherical-shell-shaped diaphragm for valve opening/closing as being pressurized by and away from a seat. A flattened part of a bottom surface at a concave position of a body is provided with an annular groove or counter bore so as to include a portion opening to a bottom surface at a concave position of a fluid outflow passage. The fluid outflow passage has a cross-sectional shape such as a circle, oval, or crescent. Also, a pressing adaptor has an entire lower surface in a tapered shape, and the flattened part of the bottom surface at the concave position of the body has a circular flattened part and a concave position connected to its outer periphery and recessed with respect to the flattened part. When the flow path is in a closed state, it is configured that an upper surface of an outer peripheral edge part of the diaphragm makes surface contact with the tapered lower surface of the pressing adaptor and a lower surface of the outer peripheral edge part makes line contact with the outer periphery of the flattened part of the bottom surface at the concave position of the body. In this literature, the above-described configuration increases the flow rate without inviting a decrease in durability of the diaphragm valve with its size decreased.

Also, as for the shape of the diaphragm, PTL 2 and PTL 3 have been suggested. In the flow-path seal apparatus described in PTL 2, the valve body has a valve base and an inlet pipe and an outlet pipe, and the diaphragm is clamped between an edge part of the valve body and an edge part of a cover. Also, the diaphragm assumes a cup shape, having a parabolic dome and a circular rim forming an angle with respect to a bottom part of the diaphragm. This circular rim has an upward-oriented annular bent part extending to a tilted annular part. The tilted annular part is linked to the dome via the annular bent part. This annular bent part is configured to extend to a peripheral edge part of the dome. In this literature, this configuration improves durability of the diaphragm, for example.

Disclosed in PTL 3 are a diaphragm shape and so forth, in which the radius of curvature of an inner portion is set twice the radius of curvature of an outer portion or more, in order to improve the life by reducing the amount of deformation while preventing interference with the bonnet of the valve and maintaining a flow gap.

Furthermore, described in PTL 4 are the inner structure of the valve chamber and so forth. The metal diaphragm valve described in this literature includes a metal diaphragm with a center part swelling upward, and is configured in the case in which a cross-sectional area crossing an annular groove formed below a valve chamber to communicate with an outflow path is larger than a cross-sectional area of the outflow path, and also in either of the case in which the annular groove includes both side surfaces and a bottom surface, the outflow path is connected to the both side surfaces and the bottom surface of the annular groove, and the outflow path has a diameter larger than a groove width of the annular groove and the case in which the diameter of the outflow path having a circular cross section is set 1.5 times to 2.5 times larger than the groove width of the annular groove. This configuration causes a flow with a large flow rate as an entire flow path from the valve chamber to the outflow path.

CITATION LIST

Patent Literatures

PTL 1: WO2016/002515
PTL 2: U.S. Pat. No. 5,967,492
PTL 3: United States Publication No. 2005/0109973
PTL 4: Japanese Patent No. 4587419

SUMMARY OF INVENTION

Technical Problem

However, from the basic principle in which the flow rate of a fluid flowing through a flow path is defined based on the flow-path cross-sectional area and the flow-path resistance, a structure capable of simply and optimally solving the above-described problems is now considered in the inner structure of the diaphragm valve including a diaphragm with an outer periphery being pressed and a vale-seat seat part in a valve chamber of a body having an inflow path and an outflow path, this diaphragm provided so as to be able to open and close the valve chamber by an ascending/descending motion of a stem. First, it is essential to reliably ensure an opening area (this flow-path cross-sectional area is hereinafter referred to as a "valve-opening cross-sectional area") defined by a space formed between the diaphragm and the valve seat where the fluid passes when flowing into the inside of the valve chamber at the time of valve opening. Also, it is required to optimize the cross-sectional area of the flow path and flow-path resistance from inflow to the valve to outflow of the fluid, that is, in the entire flow-path structure. Furthermore, together with this, in relation to ensuring the valve-opening cross-sectional area, that is, requirement to increase a diaphragm stroke, it is also required to prevent impairment of the curved-surface shape and durability of the diaphragm.

By contrast, PTL 1 describes, firstly, only a spherical-shell shape as the shape of the diaphragm. Therefore, the valve-opening cross-sectional area is not appropriately ensured. If the cross-sectional area is tried to be ensured as the shape of the diaphragm is maintained as a spherical-shell shape, the swelling height has to be increased to increase the diaphragm stroke, and the size of the diaphragm itself thus has to be increased. Therefore, the increase in size of the valve is unavoidable, and the life of the diaphragm cannot be maintained or improved. Therefore, even with reference to this literature, the above-described problems cannot be appropriately solved. Moreover, since no flattened part is present at the outer peripheral edge part of the diaphragm, the adherence of the diaphragm at least between the pressing adaptor and the body tends to be incomplete. Furthermore, the upper surface of the outer peripheral edge part of the diaphragm makes surface contact with the tapered lower surface of the pressing adaptor and the lower surface of the outer peripheral edge part of the diaphragm makes line contact with the outer periphery of the flattened part of the bottom surface at the concave position of the body, and therefore the valve structure becomes complex. Thus, it can be said that there are difficulties in operability, productivity, and maintainability.

Also, the shape of the diaphragm described in PTL 2 is a flattened cup shape with the dome part in a center region and the rim part of the outer peripheral edge part linked via the bent part with a steep angle and the tilted part. This shape is a shape that is easy to ensure the valve-opening cross-sectional area. Also, since flexibility of the substantially-flattened center region is high, an ascending/descending motion of the stem tends to follow, but this flexibility tends to cause upward swelling more easily due to the fluid pressure. Furthermore, since stiffness near the outer edge having the bent part and the tilted part is high, the rim of the outer peripheral edge part having a size with a considerably large diameter with respect to the diameter of the valve seat has to be used, so that the center part of the diaphragm can be reliably adhered to the valve seat to satisfy favorable valve-closing sealability. Therefore, an increase in size of the valve chamber, that is, an increase in size of the valve, is unavoidable. Moreover, the cross section is not in an arc shape, self-resilience to the natural shape of the diaphragm is poor. Furthermore, since the points regarding the above-described problems other than the shape of the diaphragm are not disclosed at all, the cross-sectional area of the flow path on the valve chamber side cannot be ensured. Therefore, it is impossible to solve the above-described problems with reference to this literature.

PTL 3 also has no description or suggestion regarding avoidance of an increase in size of the valve chamber and the valve and regarding an increase in flow rate. Also, the shape of the diaphragm is merely a shape set with different curvatures inside and outside for different purposes. Therefore, a specific structure of the diaphragm capable of optimally and appropriately solving the above-described problems cannot be known, and also a flow-path structure on a valve chamber side and so forth are totally unknown. Therefore, the above-described problems cannot be solved by any means with reference to the literature.

Furthermore, in PTL 4, at least the diameter of the outflow path is required to be larger than the groove width of the annular groove, and the cross-sectional area crossing the annular groove and the outflow path is required to be larger than the cross-sectional area of the outflow path. Therefore, it can be said that this structure tends to invite an increase in size of the body, that is, an increase in size of the valve. This can be attested by the fact that this literature has neither description nor suggestion regarding maintaining the size of the valve or a decrease in size. Also, since the entire inside structure of the valve chamber including the inflow and outflow paths is relatively complex, it can be said that there are difficulties at least in productivity and maintainability of the valve. Moreover, points regarding the above-described problems other than the structure of the valve chamber are not disclosed at all. Therefore, it is impossible to solve the above-described problems even with reference to this literature.

Thus, the present invention has been developed to solve the above-described problems, and has an object of providing a diaphragm valve simply and optimally configured so as to allow a certain increase of a valve flow rate while avoiding an increase in size of the valve due to an increase in diameter of a valve seat, an increase in stroke, or the like and also allow durability and the life of the valve to be maintained or improved.

Solution to Problem

To achieve the object described above, a first aspect of the invention is directed to a diaphragm valve including a diaphragm with an outer periphery being pressed and a valve seat part in a valve chamber of a body having an inflow path and an outflow path, this diaphragm provided so as to be able to open and close the valve chamber by an ascending/descending motion of a stem, wherein this diaphragm has a substantially-flat cross sectional form having a substantially-plane center region and a boundary region, the boundary region being on an outer peripheral side of the center region and having a radius of curvature smaller than that of the center region, and the boundary region is positioned near an outer peripheral side of the valve seat part.

A second aspect of the invention is directed to the diaphragm valve in which a deep groove is provided in the valve chamber on the outer peripheral side of the valve seat part, this deep groove is provided with an outlet vertical-hole flow path communicated with the outflow path, and this outlet vertical-hole flow path has a cross-sectional shape from an opening thereof along the outflow path being an arc-shaped long hole shape.

A third aspect of the invention according to claim 3 is directed to the diaphragm valve in which an inlet vertical-hole flow path for making the inflow path and the valve chamber communicate with each other is provided, and the deep groove has a flow-path cross-sectional area equal to or larger than ½ of a cross-sectional area of the inlet vertical-hole flow path.

A fourth aspect of the invention is directed to the diaphragm valve in which an outer side surface inside the deep groove is a tilted surface spreading along an opening side and, by this tilted surface, a diaphragm seal part which seals an outer peripheral position of the diaphragm is formed to have a trapezoidal cross sectional shape.

A fifth aspect of the invention is directed to a flow rate control device for a semiconductor manufacturing apparatus in which the diaphragm valve is used as a flow rate control device applied to a gas flow path of the semiconductor manufacturing apparatus.

Advantageous Effects of Invention

From the first aspect of the invention, the diaphragm of the present invention has a substantially-flat cross section having a substantially-plane center region and a boundary region, the boundary region being on an outer peripheral side of the center region and having a radius curvature smaller than that of this center region, and the boundary region is positioned near the outer peripheral side of the valve seat part. In this cross-sectional view of this diaphragm shape, the center region to the boundary region are linked via a smooth curved surface. Also, the diaphragm is provided so that the lower surface region of the diaphragm having a mild curvature in a substantially-plane shape covers the opening of the inflow path from the upper side at least from the center of the valve seat to the valve seat part. Thus, even if the valve-opening cross-sectional area is increased to ensure the required flow rate (even if the height of the diaphragm is increased with respect to the vale-seat seat part), the substantially-spherical cross section with excellent flexibility and shape resilience is maintained at least on the outer peripheral side. Also, in a seal surface region, while the substantially-plane cross section with favorable sealability is maintained, shape deformation such as upward swelling of the center part of the diaphragm can be extremely reduced.

Also, since the boundary region is at the above-described position, the shape of the diaphragm of the present invention is not a simple shape with curvatures of a center side and an outer peripheral side simply varied, but the range of the center region is reduced to a minimum-required range so as to increase the valve-opening cross-sectional area by a required amount while ensuring required valve-closing sealability. On the other hand, the region on the lower surface side of the diaphragm having a substantially arc shape with a steep curvature is a smooth concave curved surface to be linked to the outer periphery from the center region. Therefore, the fluid passing through the valve-opening cross-sectional area is smoothly guided to the inside of the valve chamber. Thus, the valve-opening cross-sectional area can be appropriately increased without inviting an increase in size and stroke of the diaphragm or an increase in size of the structure of the valve chamber, degradation of shape resilience, deterioration of valve-closing sealability, and an increase in fluid resistance, thereby allowing an increase in flow rate while reliably avoiding an increase in size of the valve.

Furthermore, the above-described shape can decrease the amount of deformation of the diaphragm with valve opening/closing, compared with a conventional diaphragm having an arc-shaped cross section with the same diaphragm stroke. Therefore, durability and the life of the diaphragm can also be maintained or improved.

From the second aspect of the invention, the deep groove is provided in the valve chamber on the outer peripheral side of the valve seat part, this deep groove is provided with an outlet vertical-hole flow path communicated with the outflow path, and the shape of the opening of this outlet vertical-hole flow path is an arc-shaped long hole shape. Therefore, the capacity of the valve chamber can be appropriately increased and ensured in accordance with the valve-opening cross-sectional area. In accordance with the capacity of this valve chamber, the opening area of the outlet vertical-hole flow path can be appropriately adjusted. Therefore, a balance between the inflow amount and the outflow amount of the fluid to the valve chamber can be appropriately harmonized, and thus the fluid resistance of the entire valve can be decreased (or a Cv value can be improved), thereby allowing an improvement in the flow rate of the valve.

Also, when the flow rate of the valve is increased, parts that can be easily improved, that is, the valve-opening cross-sectional area, the cross-sectional area on the outer peripheral side of the valve seat part, and the cross-sectional area of the outlet vertical-hole flow path, are all appropriately improved. The valve structure required for an increase in flow rate can be optimized. Furthermore, since simple improvements can be made, easy improvement and diversion of a current product, easy commonality of components, and so forth can be made, cost competitiveness, maintainability, and versatility can be significantly enhanced while avoiding designing and manufacturing of a new valve.

From the third aspect of the invention, the inlet vertical-hole flow path for making the inflow path and the valve chamber communicate with each other is provided, and the deep groove has a flow-path cross-sectional area equal to or larger than ½ of the cross-sectional area of the inlet vertical-hole flow path. Therefore, the flow-path cross-sectional area of the deep groove and the cross-sectional area of the inlet vertical-hole flow path can be adjusted at least at the level of the flow-path cross-sectional area. Thus, the flow rate of the valve can be improved.

From the fourth aspect of the invention, even if the outer peripheral edge part of the diaphragm is pressurized by a strong pressurizing force, the diaphragm seal part is formed to have a trapezoidal cross sectional shape. Therefore, the strength with respect to the pressurizing force is increased. Even the valve which supports high pressures can ensure resistance to pressure, and the magnitude of the flow-path cross-sectional area of the deep groove and the strength of the diaphragm seal part can be ensured in a balanced manner.

From the fifth aspect of the invention, the flow rate can be improved without increasing the size of the appearance. Moreover, the flow-rate control device for semiconductor manufacturing with ensured resistance to pressure can be provided.

DESCRIPTION OF EMBODIMENTS

Figure 1:
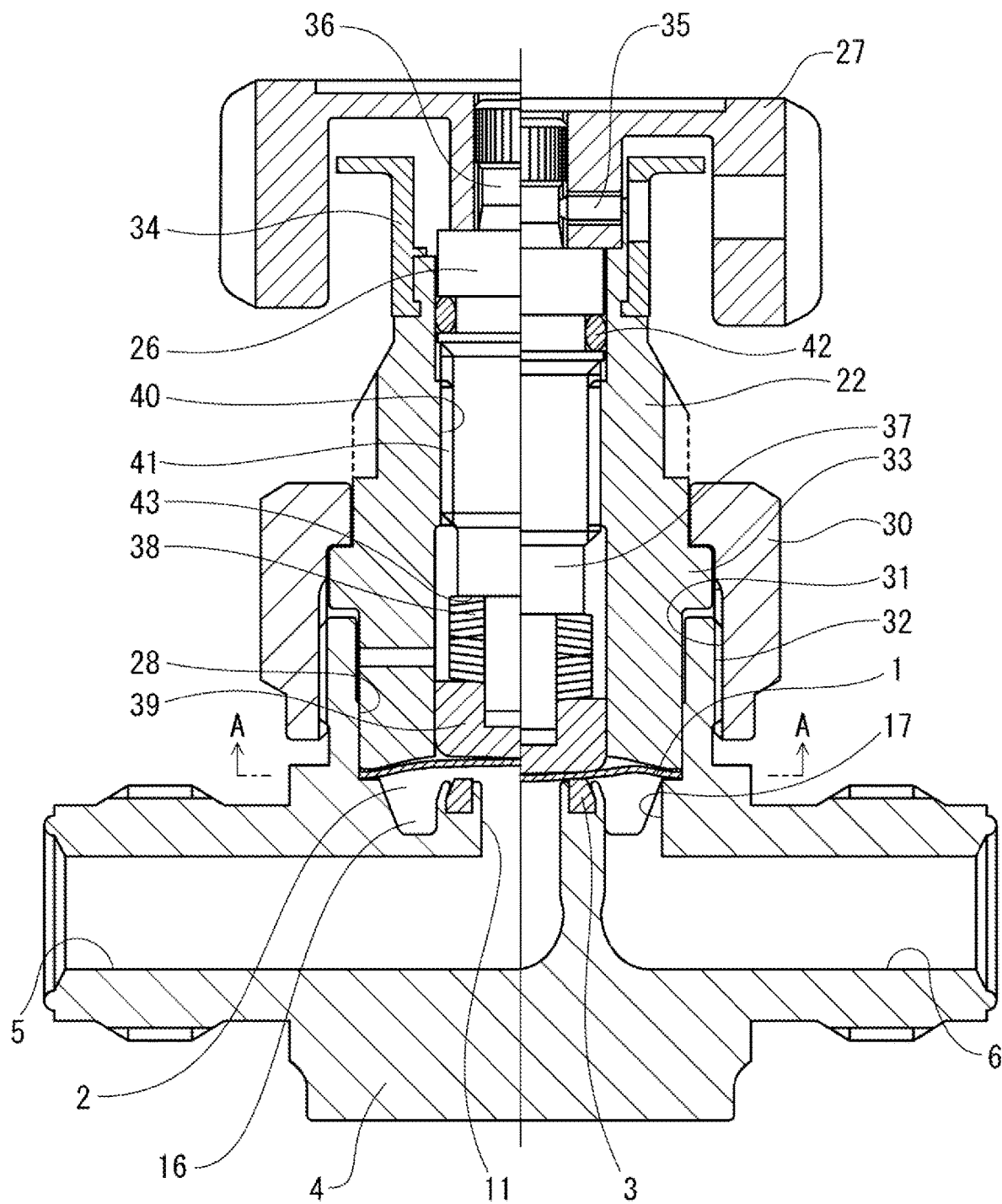
FIG. 1 is a sectional view of a diaphragm valve of the present embodiment.
Figure 2:
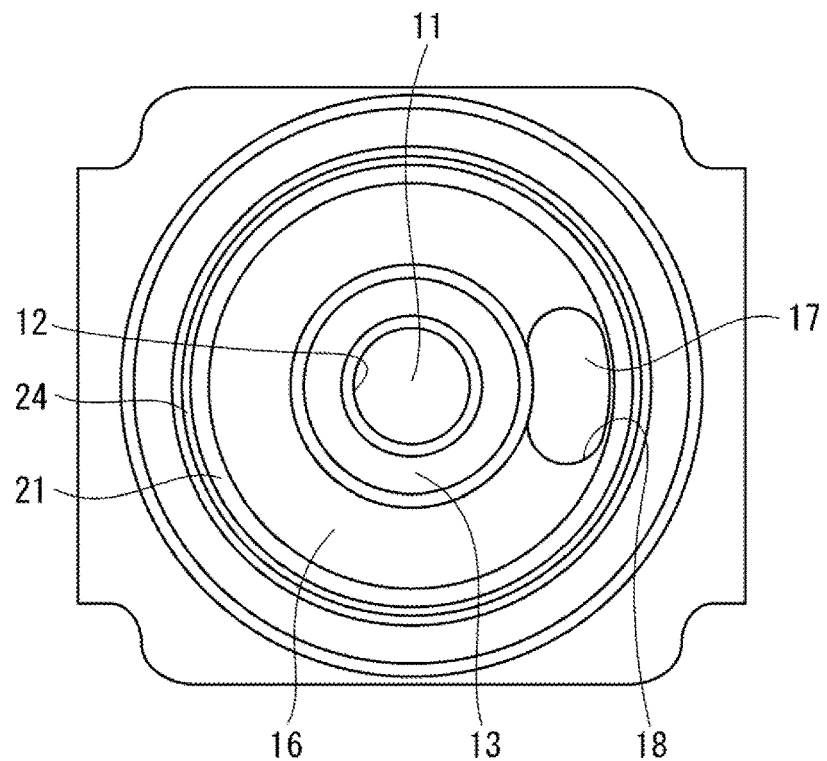
FIG. 2 is a sectional view of FIG. 1 along A-A.
Figure 4:
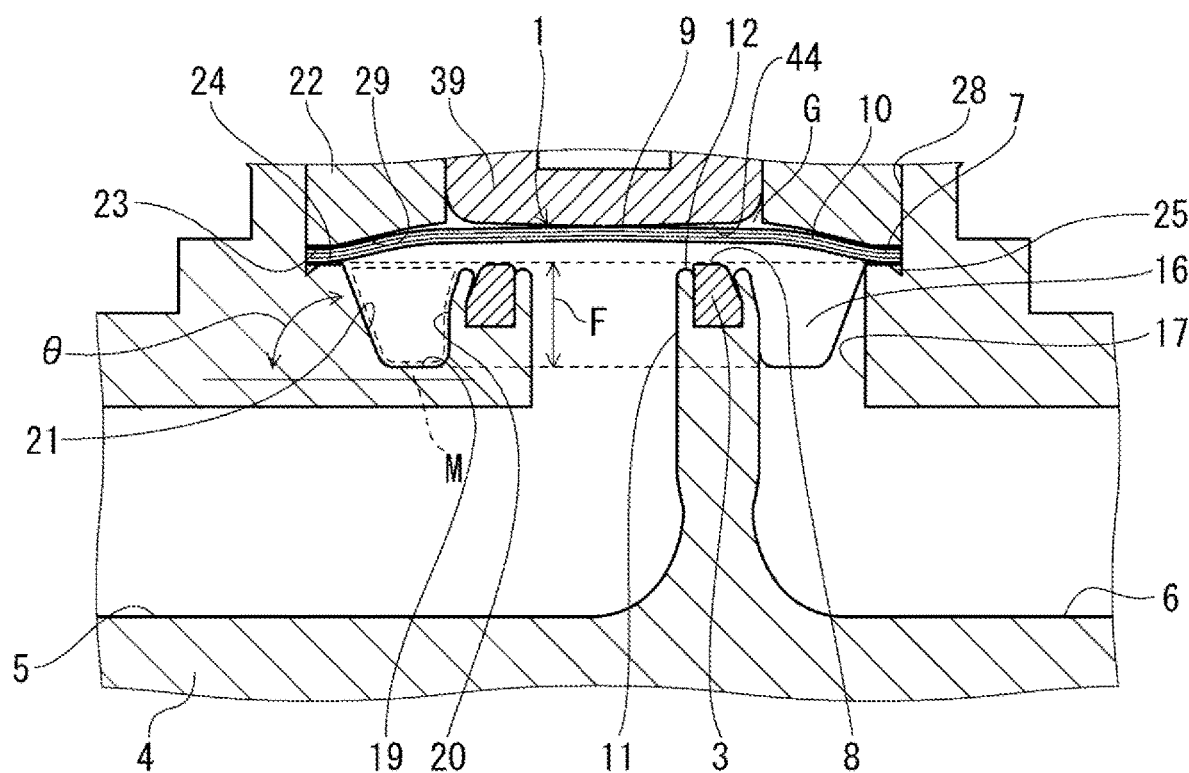
FIG. 4 is a partially-enlarged sectional view in which main parts of FIG. 1 are enlarged.
Figure 5A:
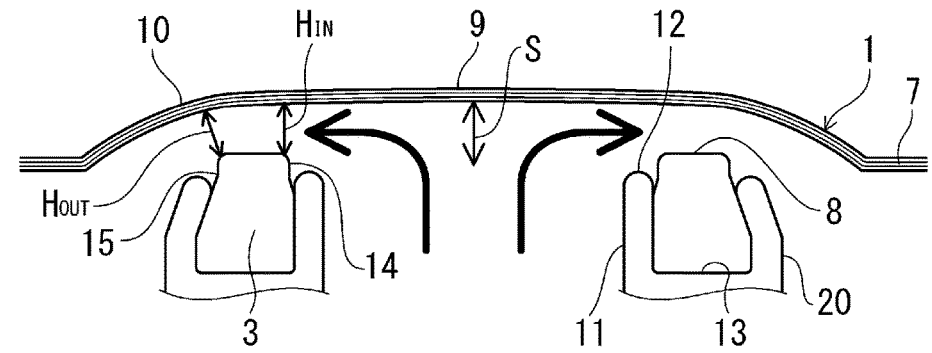
FIG. 5(a) is a sectional view schematically depicting a state in which a diaphragm of the present invention in a natural state is attached inside a valve chamber.

In the following, one embodiment of the present invention is described in detail based on the drawings. FIG. 1 is a sectional view of a diaphragm valve of the present embodiment. FIG. 2 is a sectional view of FIG. 1 along A-A, depicting a plan-view structure of a valve chamber 2. FIG. 4 is a partially-enlarged sectional view in which portions of a diaphragm 1 and the valve chamber 2 in FIG. 1 are enlarged. FIG. 5(a) is a schematic view schematically depicting a cross section of the diaphragm 1 of the present invention and a valve seat 3.

As depicted in FIG. 1, the diaphragm valve of the present invention has an inflow path 5 and an outflow path 6 in a body 4, and includes, in the valve chamber 2 of the body 4, the diaphragm 1 with an outer periphery 7 being pressed and a valve seat part 8. Also, as schematically depicted in FIG. 4 and FIG. 5(a), the diaphragm 1 (except the outer periphery 7) of the present invention has a substantially-flat cross section having a substantially-plane center region 9 and a boundary region 10, the boundary region 10 being on an outer peripheral side of the center region 9 and having a radius of curvature smaller than that of the center region 9. In a specific sectional shape of the present example, from the center region 9 including the center of the diaphragm 1 to a portion near the boundary region 10 on a circumferential edge side, a substantially-plane region is provided to swell in a dome shape by a slight height with a portion near the center as a top. This region on the center side is linked to the outer periphery 7 via a region having a substantially-arc cross section with a slightly large curvature near the boundary region 10. Therefore, the diaphragm 1 has an external shape having a flat round plate, with an extremely shallow flange edge and a flat bottom linked as being mildly rounded, with its cross section as depicted in FIG. 5(a).

This diaphragm 1 has flexibility with which the shape is deformed by the action of external deformation at the time of valve closing to be adhered to the valve seat 3 to allow sealing of the fluid and shape resilience with which self-resilience to a shape in a natural state depicted in the drawing can be made at the time of valve opening. Note that the diaphragm valve refers to a valve using a diaphragm. Therefore, for example, ascending/descending means may be a manual valve using an opening/closing handle or an automatically-controlled automatic valve using an actuator. Also, the actuator may be one by air pressure or electromagnetic force, and any valve using a diaphragm can be selected in accordance with implementation.

In FIG. 5(a), the valve seat 3 of the present example is manufactured by molding a resin (PCTFE) in a predetermined annular shape, fits in an annular groove 13 for holding the valve seat provided to an opening 12 of an inlet vertical-hole flow path 11 on a valve chamber 2 side and integrally formed with the body 4, and is fixed by crimping this annular groove 13. The valve seat part 8 is a seal surface on an upper side of the valve seat 3 to be adhered to the lower surface of the diaphragm 1 pressurized at the time of valve closing. 14 denotes an inner peripheral side of the valve seat part 8 of the present example, and 15 denotes an outer peripheral side of the valve seat part 8 of the present example. Also, S schematically represents the length of a stem stroke of the diaphragm 1 (an elastic deformation margin of a center portion in a vertical direction). Note that the valve seat 3 of the present example is a resin-made gasket crimped and fixed to the annular groove 13 as described above and, as a material, in addition to the above, a heat-resistant nonmetal member may be used such as PTFE, PI, or PFA. Furthermore, in addition to the above-described configuration, a metal-made valve seat, a valve integrally molded with the body, or the like may be used, and any can be selected in accordance with implementation. In particular, when a configuration is made of a high-hardness metal-made diaphragm and a metal-made valve seat with hardness lower than the diaphragm, such as SUS316L, the flow rate can be adjusted with high accuracy, and high durability and sealability can be achieved.

In FIG. 5(a), $H_{IN}$ represents a distance (inner height) from the inner peripheral side 14 of the valve seat part 8 to the lower surface of the diaphragm 1 in the natural state (height S) depicted in the drawing. Similarly, $H_{OUT}$ represents a distance (outer height) from the outer peripheral side 15 of the valve seat part 8 to the lower surface of the diaphragm 1. These $H_{IN}$ and $H_{OUT}$ are elements which define the valve-opening cross-sectional area (height of the flow-path cross-sectional area) formed between the valve seat 3 and the diaphragm 1, and is also approximately equal to the diaphragm (valve) stroke.

In FIG. 5(a), the center region 9 formed on the diaphragm 1 is a successive region formed so as to include the center of the circular diaphragm 1 in a centrosymmetric manner, and is a curved-surface region defined by a predetermined radius of curvature so as to have a substantially-plane shape but to slightly be convex upward. This center region 9 is suitable if the region and the radius of curvature are set so that the length of the stroke S is maintained to be approximately equal to the inner height $H_{IN}$ (or outer height $H_{OUT}$).

In FIG. 5(a), the boundary region 10 formed on the diaphragm 1 is an annular curved surface region formed so as to surround the outer peripheral side of the center region 9 in a centrosymmetric manner. Also, the radius of curvature of this curved surface is set so as to be smaller than the radius of curvature of the center region 9. This boundary region 10 is suitable if the region and the radius of curvature are set so that the shape of a portion of the center region 9 and the outer periphery 7 can be smoothly linked while the shape of the diaphragm 1 except the outer periphery 7 is maintained to have a substantially flat cross section.

Figure 5B:
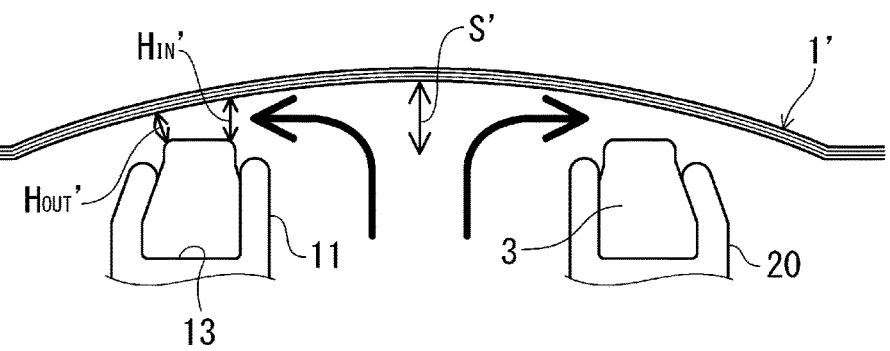
FIG. 5(b) is a sectional view schematically depicting a state in which a conventional diaphragm in a natural state is attached inside a valve chamber.

Also, in the diaphragm 1 of the present invention, the boundary region 10 is positioned near the outer peripheral side 15 of the valve seat part 8. In the present example, as depicted in FIG. 5(*a*), the region and the radius of curvature are set so that the outer height $H_{OUT}$ and the inner height $H_{IN}$ are approximately equal to each other. Also, the center region 9 and the outer periphery 7 are linked via a portion near this boundary region 10 so that the diaphragm 1 covers a portion near the valve seat part 8 and the outer peripheral side 15 from upper side while a distance between the valve seat 3 and the diaphragm 1 maintains a minimum-required distance for ensuring the flow-path cross-sectional area (valve-opening cross-sectional area). Furthermore, when the flow rate to be ensured is determined in advance, that is, when the inner height $H_{IN}$ (or outer height $H_{OUT}$) is determined in advance, for example, although not depicted, an appropriate region of the boundary region 10 may be selected from a concave curved surface which circumscribes an arc-shaped trail in a cross-sectional view formed by a region where the distance from the outer peripheral side 15 of the valve seat part 8 is $H_{OUT}$ (or $H_{IN}$).

Note that both of the center region 9 and the boundary region 10 are not to be limited to have a curved-surface shape defined by one radius of curvature, and are not limited by the above-described embodiment as long as the entire cross-sectional shape is a flat spherical-surface shape.

On the other hand, FIG. 5(*b*) and FIG. 5(*c*) schematically depict cross-sectional shapes of conventional diaphragms 1' and 1", respectively, in a natural state, and each have an arc-shaped cross section. S' of FIG. 5(*b*) represents a stroke having a length on the order of the diaphragm stroke S of FIG. 5(*a*) depicting the present invention. $H_{IN}'$ and $H_{OUT}'$ of the drawing represent an inner height and an outer height, respectively, in the case of this stroke S'. As depicted in FIG. 5(*b*), when the arc-shaped cross sectional shape is maintained while the stroke S' is set on the order of S, since the curvature is constant, the curve is steep particularly on the outer peripheral side, and the outer height $H_{OUT}'$ has to be lower compared with $H_{OUT}$. Therefore, the valve-opening cross-sectional area is decreased, and the required flow rate cannot be ensured.

Also, as depicted in FIG. 5(*c*), when the outer height $H_{OUT}"$ is ensured on the order of $H_{OUT}$ in the case of the arc-shaped cross sectional shape, since the size of the diaphragm is the same, the curvature of the arc has to be increased by this increase in height, and upward swelling occurs particularly on a center side. Thus, the stroke S" has to be higher than compared with S. This invites an increase in size of the valve due to the increase in valve stroke and a decrease in life due to the increase of the amount of deformation of the diaphragm.

By contrast, in the case of the cross-sectional shape of the diaphragm 1 of the present invention depicted in FIG. 5(*a*), the heights $H_{IN}$ and $H_{OUT}$ are ensured (the valve-opening cross-sectional area is ensured), and a required increase in flow rate can be made. Also, the entirety maintains a substantially-flat cross section. In other words, an optimized cross-sectional shape is formed by setting the stroke S and the height $H_{IN}$ or $H_{OUT}$ at the same order to ensure the valve-opening cross-sectional area. Therefore, since the lower surface of the diaphragm 1 is approximately planar on the upper side of the valve seat part 8, and is smoothly curved on the lower surface of the boundary region, while a space between the diaphragm 1 and the valve seat part 8 is not narrowed and a wide flow path and valve-opening cross-sectional area is ensured, the size of the diaphragm 1 itself can be minimized. Furthermore, this structure of the diaphragm 1 also allows a decrease in stroke of the diaphragm 1 at the time of driving (the amount of deformation of the diaphragm 1) and allows high durability to be acquired. Still further, since the substantially-spherical cross section is maintained at least on the outer periphery 7 side, high shape resilience can also be ensured. Still further, due to a smooth contact surface, the fluid resistance is small.

Still further, when the diaphragm has a conventional arc-shaped (or dome-shaped) cross section, only a diaphragm (valve) stroke smaller than the stem stroke can be acquired. Therefore, only a small flow rate with respect to the stem stroke can be acquired. This is not efficient, and at this point, inefficiency is higher as the swelling dome of the diaphragm shape is higher (the radius of curvature of the arc-shaped cross section is smaller). However, in the diaphragm 1 of the present invention, the above-described configuration makes the stem stroke and the diaphragm stroke approximately equal to each other (S and $H_{IN}$ or $H_{OUT}$ are approximately equal to each other). Therefore, the flow rate can be efficiently ensured, and efficiency in ensuring the flow rate is significant particularly when the flow path has a large diameter.

Note that the diagram 1 of the present example is provided by cutting a thin plate made of high-hardness metal such as a Co alloy, Ni—Co alloy, SUC, Inconel, or Hastelloy into a circle, swelling the center upward in a reverse dish shape, and laminating a plurality of these plates as appropriate.

Next, the inner structure of the valve chamber 2 of the present invention 2 is described. As depicted in FIG. 1, FIG. 2, and FIG. 4, a deep groove 16 is provided in the valve chamber 2 on the outer peripheral side 15 of the valve seat part 8, this deep groove 16 is provided with an outlet vertical-hole flow path 17 communicated with an outflow path 6, and an opening 18 of this outlet vertical-hole flow path 17 has an arc-shaped long hole shape. Also, an inlet vertical-hole flow path 11 for making the inflow path 5 and the valve chamber 2 communicate with each other is provided, and the deep groove 16 has a flow-path cross-sectional area equal to or larger than ½ of a cross-sectional area of the inlet vertical-hole flow path 11.

As depicted in FIG. 2 and FIG. 4, in the valve chamber 2 of the present invention, the deep groove 16 is annularly provided, having a bottom surface 19, an inner side surface 20, and an outer side surface 21 and having a determined depth F. The depth F of the present example has a height from the opening 12 to the bottom surface 19, and is set on the order of approximately twice the height of the valve seat 3 as depicted. A region M on a lower side from the opening 12 and surrounded by the inner side surface 20, the outer side surface 21, and the bottom surface 19 is a flow-path cross-sectional area of the deep groove 16. Also, the outer side surface 21 of the present example is a tilted surface at an angle θ with respect to the bottom surface 19. An upper end part of this outer side surface 21 is linked to a diaphragm seal part 24 which holds the outer periphery 7 of the diaphragm 1 together with a diaphragm pressurizing part 23 of a cap 22, which will be described further below, from the lower side and can be fluid-tightly adhered and fixed thereto. The diaphragm seal part 24 has a tilted surface because a groove part 25 is formed also on an outer diameter side as depicted in FIG. 4, and is thus formed to have a substantially trapezoidal cross sectional shape. That is, the outer side surface 21 of the deep groove 16 is a tilted surface (outer side surface) 21 spreading along an opening side above the deep groove 16 and, by this tilted surface 21, the diaphragm seal part 24 which seals an outer peripheral position of the diaphragm 1 is formed to have a trapezoidal cross sectional shape.

Note that the cross-sectional shape or the flow-path cross-sectional area of the deep groove 16 of the present invention can be set at any shape or cross-sectional area in accordance with implementation in order to improve a Cv value in accordance with an increase in fluid resistance (adjustment of a flow-rate balance) based on an increase in the valve-opening cross-sectional area, and may have, in addition to the above-described structure, a cross section in any of rectangular, trapezoidal, semi-arc, oval, and other shapes and may have a cross section where inner and outer side surface parts and a bottom surface part are not formed.

Also, the tilted angle θ of the outer side surface 21 can be set at any angle in accordance with implementation, and is set at approximately 70 degrees in the present example. The reason for this is as follows. Since the outer periphery 7 of the diaphragm 1 of the present example has a structure, as will be described further below, so as to be pressurized by the diaphragm pressurizing part 23 of the cap 22 from the upper side to be adhered and fixed to the inside of the valve chamber 2, as the valve supports higher pressures, it is required to enhance the pressurizing force of the cap 22 to enhance diaphragm sealability and so forth in order to ensure resistance to pressure. thus, with the strong pressurizing force of the cap 22, there is a possibility of a crush of the diaphragm seal part 24. If a crush occurs, the position of the diaphragm 1 goes down at least by the amount of the crush to narrow the valve-opening cross-sectional area, thereby inviting a decrease in flow rate. Therefore, the diaphragm seal part 24 is formed so as to have a tapered trapezoidal cross sectional shape to ensure structural durability against the pressurizing force from the upper side.

And, as this tilted angle θ of the outer side surface 21 is smaller, the diaphragm seal part 24 has a wider tapered cross section, thereby allowing an increase in strength. On the other hand, since the outer side surface 21 inside the deep groove 16 is a tilted surface spreading along the opening side, the area of the region M is narrowed. As the angle θ becomes more vertical, the region M becomes more in a rectangular shape, and a wide flow-path cross-sectional area of the deep groove 16 can be ensured. Therefore, the angle is optimal if both of the magnitude of the flow-path cross-sectional area of the deep groove 16 and the magnitude of the strength of the diaphragm seal part 24 can be ensured in a balanced manner. In the present example, this angle is optimal at 70 degrees.

Furthermore, as for the inner structure of the valve chamber 2, the depth F is set to be relatively shallow so that the height of the valve seat 3 inside the valve chamber 2 is low. For example, by setting the height of the valve seat part 8 lower than the height of the diaphragm seal part 24, a large valve-opening cross-sectional area may be ensured.

In FIG. 2, the deep groove 16 is provided with the outlet vertical-hole flow path 17 communicated with the outflow path 6. In the present example, the opening 18 of this outlet vertical-hole flow path 17 has an arc-shaped long hole shape. Also, the outlet vertical-hole flow path 17 has a cross-sectional area equivalent to or larger than the cross-sectional area of the inlet vertical-hole flow path 11 for making the inflow path 5 and the valve chamber 2 communicate with each other. Furthermore, the cross-sectional area of the inlet vertical-hole flow path 11 is equal to or smaller than twice the flow-path cross-sectional area of the deep groove 16. Note that the shape of the opening 18 of the outlet vertical-hole flow path 17 may be set to be any in addition to the above, such as a crescent shape or oval shape along the deep groove 16, in accordance with a reduction in the flow-path cross-sectional area of the deep groove and fluid resistance or the like.

With the above-described structure, in the diaphragm valve of the present invention, the shape (valve-opening cross-sectional area) of the diaphragm 1 can increase the flow rate from the inlet vertical-hole flow path 11 to the inside of the valve chamber 2 at least without an increase in size of the valve, a deterioration in characteristic of the diaphragm 1, or the like. In accordance with this increase in flow rate, the deep groove 16 ensures the capacity inside the valve chamber 2, and the inflow resistance of the fluid from a space between the diaphragm 1 and the valve seat part 8 to the valve chamber 2 is decreased to achieve smoothness. In accordance with this increase in capacity by the deep groove 16, the opening 18 of the outlet vertical-hole flow path 17 is ensured, and the inflow resistance of the fluid from the deep groove 16 to the outlet vertical-hole flow path 17 is decreased to achieve smoothness. Also, the cross-sectional area of the inlet vertical-hole flow path 11, the flow-path cross-sectional area of the deep groove 16, and the cross-sectional area of the outlet vertical-hole flow path 17 are mutually and appropriately adjusted, and therefore at least the flow-rate balance is harmonious. Furthermore, an improvement (an increase in diameter) of the inflow path 5 and the outflow path 6 of the body 4 can also achieve an increase in flow rate. Actually, while the Cv value of a conventional product was on the order of 0.8, the Cv value was made on the order of 1.2 fold to 1.5 fold in the present example without increasing the shape of the appearance of the diaphragm valve of the present example.

In studying an improvement in the inner structure to improve the flow rate of the direct diaphragm valve, it is possible to ensure a sufficient flow-path cross-sectional area as for the inflow path 5, the inlet vertical-hole flow path 11, and the outflow path 6. Therefore, as a scope for simple and optimal structural improvement, there are three locations, that is, the valve-opening cross-sectional area (area of a region between the diaphragm and the valve seat), the inner structure of the valve chamber 2 on the outer peripheral side of the valve seat 3, and the cross-sectional area of the outlet vertical-hole flow path 17. In the present invention, the above-described configuration improves all of these three locations and achieves an appropriate improvement in flow rate. Furthermore, valve durability is ensured while an increase in size of the appearance is avoided. Thus, in the present invention, the valve structure is optimized (the flow-path volume is maximized) with respect to the conventional problems.

Next, the structure of another portion of the diaphragm valve of the present invention is described. As depicted in FIG. 1, the diaphragm valve of the present embodiment is a manual valve with a handle 27 as ascending/descending motion means of a stem 26. The body 4 is formed of metal such as stainless steel (SUS316L). Inside the body 4, a primary-side flow path having a substantially L-shaped cross section formed of the inflow path 5 and the inlet vertical-hole flow path 11 and a secondary-side flow path having a substantially L-shaped cross section formed of the outflow path 6 and the outlet vertical-hole flow path 17. These are linked to the valve chamber 2 described above. Also, on an outer peripheral side of the valve chamber 2, an annular concave part 28 conforming to the outer diameter of the cap 22 to allow fitting of this is formed. Note that an entire or part of a contact surface of the body 4 and inside the valve chamber 2 where the fluid makes contact may be subjected to surface treatment such as mirror finish at a sub-micron level.

In FIG. 1 and FIG. 4, the cap 22 is made of metal such as stainless steel (SUS304) and is formed in a substantially cylindrical shape, and is provided, on its lower end face, with a concave surface part 29 having a substantially arc-shaped cross section and the diaphragm pressurizing part 23 on its outer periphery. When the diaphragm valve is assembled, the outer periphery 7 of the diaphragm 1 is placed on the diaphragm seal part 24, a lower outer circumferential surface of the cap 22 is inserted to fit in the inner circumferential surface of the annular concave part 28 of the body 4, and the diaphragm pressurizing part 23 of the cap 22 is placed on an upper side of the outer periphery 7 of the diaphragm 1. Next, when a female screw part 31 of a fastening member 30 (union nut) provided to the cap 22 is screwed to a male screw part 32 of the body 4, the fastening member 30 moves to press a flange part 33 provided to the cap 22 with this screwing to fasten the cap 22 to the body 4. With this fastening, the diaphragm pressurizing part 23 can pressurize the outer periphery 7 of the diaphragm 1 from the upper side to be fixedly attached. Furthermore, a predetermined open/close indicator panel 34 is also fixedly attached to an upper part of the cap 22.

In FIG. 1, the handle 27 is formed of die-cast aluminum (ADC12), resin, or the like into a predetermined shape, and is fixedly attached to an upper part 36 of the stem 26 with a fastening screw 35 (with a hexagonal hole) screwed from a horizontal hole. Although not depicted, the open/close indicator panel 34 is provided from an upper side of the valve so as to be easily visually recognized. Also, on a lower part 37 of the stem 26, a disc spring 38 and a pressurizing member 39 (diaphragm piece) are provided. Thus, the ascending/descending motion member of the present example is configured of the stem 26, the handle 27, the disc spring 38, and the pressurizing member 39.

In FIG. 1, the stem 26 is made of metal such as stainless steel (SUS303) and formed in a substantially rod shape. On an outer circumferential surface of the stem 26, a male screw part 41 is provided which can be screwed to a female screw part 40 provided on an inner circumferential surface of the cap 22. With this male screw part 41 proceeding and receding with respect to the female screw part 40, the ascending/descending motion member makes an ascending/descending motion in a range of the stem stroke. Between the stem 26 and the cap 22, an O-ring 42 is provided to seal a space between the stem 26 and the cap 22 and smooth sliding (rotation) of the stem 26 inside the cap 22. Also, the disc spring 38 is provided on the lower part 37 of the stem 26 to elastically press a space between a step part 43 of the stem 26 and the pressurizing member 39 (elastically press the pressurizing member 39 toward the diaphragm 1). Furthermore, a predetermined clearance is allocated between the pressurizing member 39 and a lower end part of the stem 26.

The pressurizing member 39, with a metal such as stainless steel (SUS304) as a material, is provided to the valve so as to be able to directly touch the diaphragm 1, having a mechanism as a bearing mechanism so that a rotation thrust of the stem 26 (disc spring 38) is prevented from being transmitted to the diaphragm 1 and also a mechanism of absorbing or correcting an error by elastic deformation of the pressurizing member 39 even if a misalignment is present to some degree between the stem 26 and the pressurizing member 39, between the diaphragm 1 and the valve seat 3, or the like, thereby making a seal surface pressure at the valve seat part 8 at the time of valve closing uniform to a circumferential direction.

Note that while deformation occurs at the time of valve closing so that a stress is concentrated mainly on a region between the seal surface and the outer periphery 7 of the diaphragm 1, if a space is allocated so that this deformed diaphragm 1 can be freely deformed without making contact with the pressurizing member 39 and the concave surface part 29 as less as possible, this is suitable because a superfluous stress with which the diaphragm 1 is burdened by forcible deformation is reduced, deterioration and destruction due to stress concentration is also reduced, and the life of the diaphragm 1 is improved. Thus, for example, the shape of a pressuring surface part 44 which makes contact with the diaphragm formed in a centrosymmetric convex curved-surface shape may be formed so that the curvature on an outer edge side is larger than that on a center side in a range not impairing sealability to form a large curve on the outer edge side, and with this shape, a space (gap G) allowing free deformation of the diaphragm 1 may be allocated.

Subsequently, the mechanism of the present embodiment is described. As depicted in FIG. 1, the diaphragm valve of the present invention is a diaphragm valve with the diaphragm 1 so as to be able to open and close the valve chamber by an ascending/descending motion of the stem 26. A left half in the drawing depicts a full-open state, and a right half depicts a full-close state.

In FIG. 1, the operation from full-open to full-close of the valve is described. With the handle 27 in a full-open state being rotated, the stem 26 corotates and the male screw part 41 causes the female screw part 40 of the cap 22 to descend. This descent causes the step part 43 of stem 26 to press the disc spring 38 downward while maintaining a substantially non-rotation state. This descent of the disc spring 38 elastically presses the pressurizing member 39 downward to pressurize the diaphragm 1 downward, thereby allowing a center side of the diaphragm 1 in a natural state to be gradually recessed to be deformed toward the valve seat part 8. In accordance with the amount of deformation, a valve-opening cross-sectional area is defined. With the handle 27 (stem 26) being locked in the course of stroke, the flow rate can be adjusted in a predetermined range. When the handle 27 is further rotated, the diaphragm 1 is further pressurized and deformed to narrow the valve-opening cross-sectional area. Eventually, the seal surface of the diaphragm 1 is adhered to the valve seat part 8 to cause the valve in a full-close state.

Figure 3:
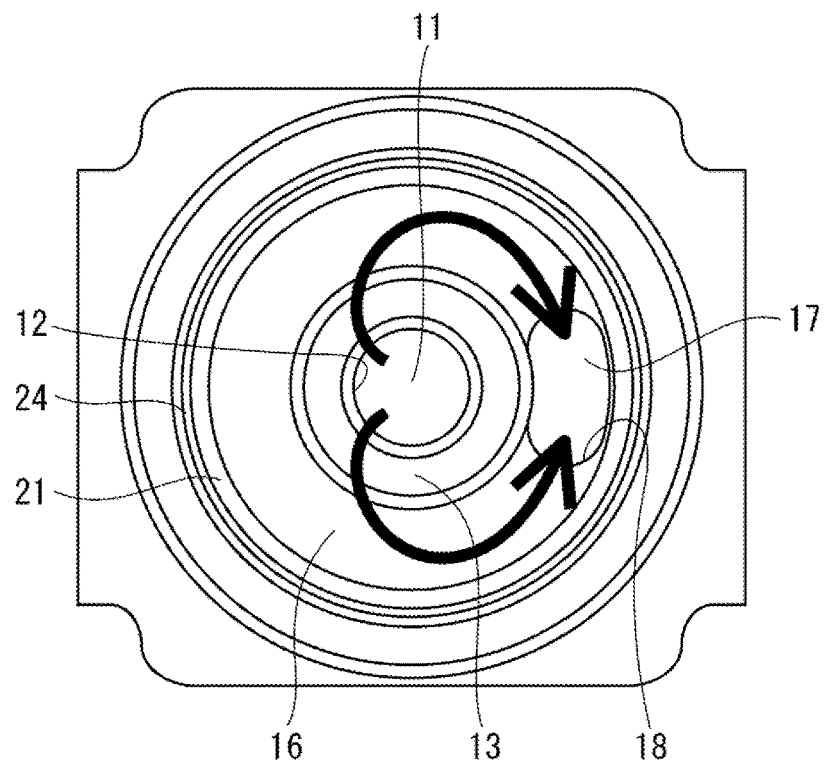
FIG. 3 is a schematic view schematically depicting a flow of a fluid in FIG. 2.
Figure 5C:
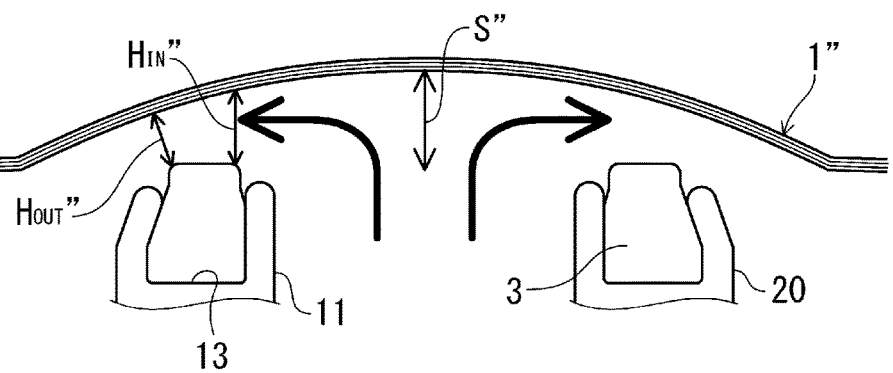
FIG. 5(c) is a sectional view schematically depicting a diaphragm acquired by decreasing a radius of curvature of the conventional diaphragm in a natural state depicted in FIG. 5(b).

As depicted in FIG. 5(a), at the time of valve opening, the fluid flowing from the inlet vertical-hole flow path 11 makes contact with the diaphragm 1 and flows into a valve chamber 2 side so as to diffuse to a substantially right angle direction, and its valve-opening cross-sectional area is ensured so as to be large compared with the valve-opening cross-sectional area of the conventional valve with the same degree of the stem stroke depicted in FIG. 5(c). Also, since the fluid basically flows into the inside of the valve chamber 2 without directivity, as depicted in FIG. 3, the fluid flows uniformly into the inside of the deep groove 16 of the valve chamber 1, and this fluid goes from two directions to the opening 18 of the outlet vertical-hole flow path 17 provided at one location so as to communicate with the deep groove 16.

Thus, in considering at least the flow-rate balance of the valve, it can be thought that the amount of flow flowing from the inlet vertical-hole flow path 11 to the valve chamber 2 is divided into two and these flow each in the same manner from two directions to the outlet vertical-hole flow path 17 at one location. Therefore, by ensuring the flow-path cross-sectional area of the deep groove 16 equal to or large than ½ of the cross-sectional area of the inlet vertical-hole flow path 11, the flow-rate balance between the inflow path 5 and the valve chamber 2 can be harmonized. Similarly, if the cross-sectional area of the outlet vertical-hole flow path 17 is set to the same degree as the cross-sectional area of the inlet vertical-hole flow path 11, the flow-path balance between the inflow path 5 and the outflow path 6 can also be harmonized.

This diaphragm valve is applied to a fluid control device provided to a gas flow path of a semiconductor manufacturing apparatus such as a CVD, ALD, and etching apparatus. This fluid control device is provided in the course of the gas flow path, and is configured of a pressure sensor, a check valve, a regulator, a mass-flow controller, or an open/close valve, which is a diaphragm valve in the present example, and other components. In particular, by applying the diaphragm valve of the present example to this fluid control device, it is possible to acquire a fluid control device including a diaphragm valve which is compact but allows a flow to be made with a maximum flow rate and is also excellent in resistance to pressure.

Furthermore, the present invention is not limited to the description of the above embodiments, and can be variously modified in a range not deviating from the gist of the invention described in claims of the present invention.

REFERENCE SIGNS LIST 1 diaphragm
2 valve chamber
3 valve seat
4 body
5 inflow path
6 outflow path
7 outer circumference
8 valve seat part
9 center region
10 boundary region
11 inlet vertical-hole flow path
15 outer peripheral side
16 deep groove
17 outlet vertical-hole flow path
18 opening
26 stem

The invention claimed is:

1. A diaphragm valve comprising:
a body having a valve chamber, and an inflow path and an outflow path each being in communication with the valve chamber;
a stem arranged to be vertically movable within the body;
a diaphragm having a center region, an outer periphery, and a boundary region between the center region and the outer periphery, the diaphragm being arranged so as to be able to open the valve chamber by an ascending motion of the stem and to close the valve chamber by a descending motion of the stem;
a valve seat part arranged in the valve chamber;
a groove provided in the valve chamber on an outer peripheral side of the valve seat part, the groove having an outlet vertical-hole flow path communicated with the outflow path, an opening of the outlet vertical-hole flow path having an arc-shaped elongated hole shape in a cross-section along the outflow path; and
a pressurizing member provided on a lower part of the stem and being arranged to ascend and descend with the stem, the pressurizing member having a pressuring surface which presses an upper surface of the diaphragm,
wherein the center region is positioned where the valve seat part is sealed, is a successive region formed so as to include a center of the diaphragm in a centrosymmetric manner, and is a curved-surface region having a first radius of curvature so as to be convex upward,
wherein the boundary region is an annular curved surface region formed so as to surround an outer peripheral side of the center region in a centrosymmetric manner, and has a second radius of curvature so as to be convex upward, the first radius of curvature being larger than the second radius of curvature,
wherein an inlet vertical-hole flow path is provided for making the inflow path and the valve chamber communicate with each other via an opening of the inlet vertical-hole flow path, and a cross-sectional area of the groove on a lower side from the opening of the inlet vertical-hole flow path is equal to or larger than ½ of a cross-sectional area of the inlet vertical-hole flow path,
wherein the body includes a diaphragm seal part, the outer periphery of the diaphragm being pressed against an upper surface of the diaphragm seal part so as to define an upper surface of the valve chamber,
wherein the diaphragm seal part is fluid-tightly adhered and fixed to the outer periphery of the diaphragm,
wherein the groove has an outer side surface and a bottom surface, the outer side surface being inclined with respect to the bottom surface, the outer side surface extending from the bottom surface of the groove to the upper surface of the diaphragm seal part such that an upper end part of the outer side surface of the groove forms an inner diameter side surface of the diaphragm seal part,
wherein a groove part is formed on an outer diameter side of the diaphragm seal part such that the diaphragm seal part has a cross-sectional shape in which the inner and outer diameter side surfaces of the diaphragm seal part taper towards the upper surface of the diaphragm seal part,
wherein the pressuring surface has a centrosymmetric convex-surface shape, and a curvature on an outer edge side of the pressuring surface is larger than a curvature at a center of the pressuring surface so as to create a space between the upper surface of the diaphragm and the outer edge side of the pressuring surface when the pressuring surface presses the upper surface of the diaphragm,
and wherein a separation distance from an inner peripheral edge of the valve seat part to a lower surface of the center region is a first distance, wherein a separation distance from an outer peripheral edge of the valve seat part to a lower surface of the boundary region is a second distance, and wherein the first radius of curvature, the second radius curvature and an outer diameter of the center region are set such that, when the diaphragm is in an unpressurized state, the first distance and the second distance are equal to each other.

2. A flow rate control device for a semiconductor manufacturing apparatus, wherein the diaphragm valve according to claim 1 is used as a flow rate control device applied to a gas flow path of the semiconductor manufacturing apparatus.

\* \* \* \* \*